INVENTOR
EDWARD A. PRIJATEL

BY
Oberlin, Maky, Donnelly & Renner
ATTORNEYS

March 10, 1970     E. A. PRIJATEL     3,499,390

ROTARY PUMP

Filed April 11, 1968     2 Sheets-Sheet 2

INVENTOR
EDWARD A. PRIJATEL

BY
Oberlin, Maky, Donnelly & Renner
ATTORNEYS

United States Patent Office 3,499,390
Patented Mar. 10, 1970

3,499,390
ROTARY PUMP
Edward A. Prijatel, Lyndhurst, Ohio, assignor to Parker-Hannifin Corporation, Cleveland, Ohio, a corporation of Ohio
Filed Apr. 11, 1968, Ser. No. 720,562
Int. Cl. F04c 1/04; F04b 21/08
U.S. Cl. 103—126                 20 Claims

ABSTRACT OF THE DISCLOSURE

A rotary pump (or motor) having a wear plate and thrust plate in sealing engagement with opposite sides of the pump impellers to prevent fluid leakage between the high and low pressure zones, with vent grooves in the inner face of the pump housing engaged by the thrust plate on the low pressure side for relieving high pressure therebehind to provide a substantial balance in the pressure acting on opposite sides of the thrust plate. Relieved portions on the outer periphery of high pressure side of thrust plate provide a large zone of high pressure in the pump cavity which may be communicated with intermediate compartments behind the wear plate through apertures therein; and a low pressure relief valve in bore of pump shaft maintains sufficient back pressure against shaft seal to keep out air and foreign matter.

Background of the invention

This invention relates generally as indicated to a rotary pump (or motor) and more particularly to certain improvements in rotary pumps or motors especially of the type disclosed in the copending application of Leonard H. Reimer and Edward A. Prijatel, Ser. No. 552,462, filed May 24, 1966, now Patent No. 3,416,459.

In gear type pumps and motors it is common practice to provide a flexible wear plate which is maintained in sealed engagement with one of the faces of the pump gears to prevent internal fluid leakage between the high and low pressure zones of the pump cavity by introducing fluid pressure behind the wear plate. Through proper selection of the fluid pressures supplied to various compartments behind the wear plate, a substantial pressure balance may be established on both side of the wear plate as for example in the manner disclosed in the aforementioned Reimer et al. application with only a slight unbalance in a direction urging the wear plate toward the adjacent gear faces to effect proper sealing but without excessive friction and consequent wear.

The opposite gear faces are often placed in direct engagement with the pump housing which will provide an effective seal, but there may be undesirable wear of the housing surface. Accordingly, a fixed thrust plate is often interposed between such opposite gear faces and adjacent housing surface to eliminate such wear and provide the desired fluid seal.

Inherent with the use of a thrust plate, however, is the problem of high pressure in the form of a thin film of fluid which leaks from the pump cavity behind the entire back face of the thrust plate. On the high pressure side the pressure is substantially balanced by the opposing pressure in the pump cavity but the pressure in the pump cavity on the low pressure side is insufficient whereby the thrust plate is pushed too tightly against the gear faces. Various attempts have been made to relieve this excessive pressure behind the thrust plate on the low pressure side as by providing holes in the thrust plate or a marginal recess in the low pressure side of the thrust plate, or even providing a thrust plate which engages the gear faces only on the high pressure side, but in each instance the gear faces are not fully sealed and supported around their entire peripheries.

Another drawback is that a thrust plate precludes the use of sickle grooves or the like in the housing wall for providing a large high pressure zone in the pump cavity which may be communicated with intermediate compartments behind the wear plate in the manner contemplated in co-pending application Ser. No. 552,462.

Summary of the invention

With the foregoing in mind, it is a principal object of this invention to provide a pump or motor of the type generally described in which a flat thrust plate is disposed between one of the gear faces and the adjacent housing wall to establish the desired seal, with vent grooves in such housing wall behind the thrust plate on the low pressure side communicating with the inlet to relieve any excess pressure tending to force the low pressure side of the thrust plate against the gear faces.

Another object is to provide for slight deflection of the thrust plate into the vent grooves whereby the depression formed by such deflection serves as a lubrication groove between the gear face and thrust plate.

Another object is to provide relieved portions on the outer periphery of the thrust plate on the high pressure side to establish a large high pressure zone in the pump cavity which may be communicated with intermediate compartments behind the wear plate through appropriately located apertures in the wear plate.

Still another object is to provide such a pump or motor with a novel low pressure relief valve assembly in the bore of one of the pump gear shafts for maintaining sufficient back pressure against the shaft seal to keep out air and foreign matter.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Description of the preferred embodiment

Figures 1, 7:
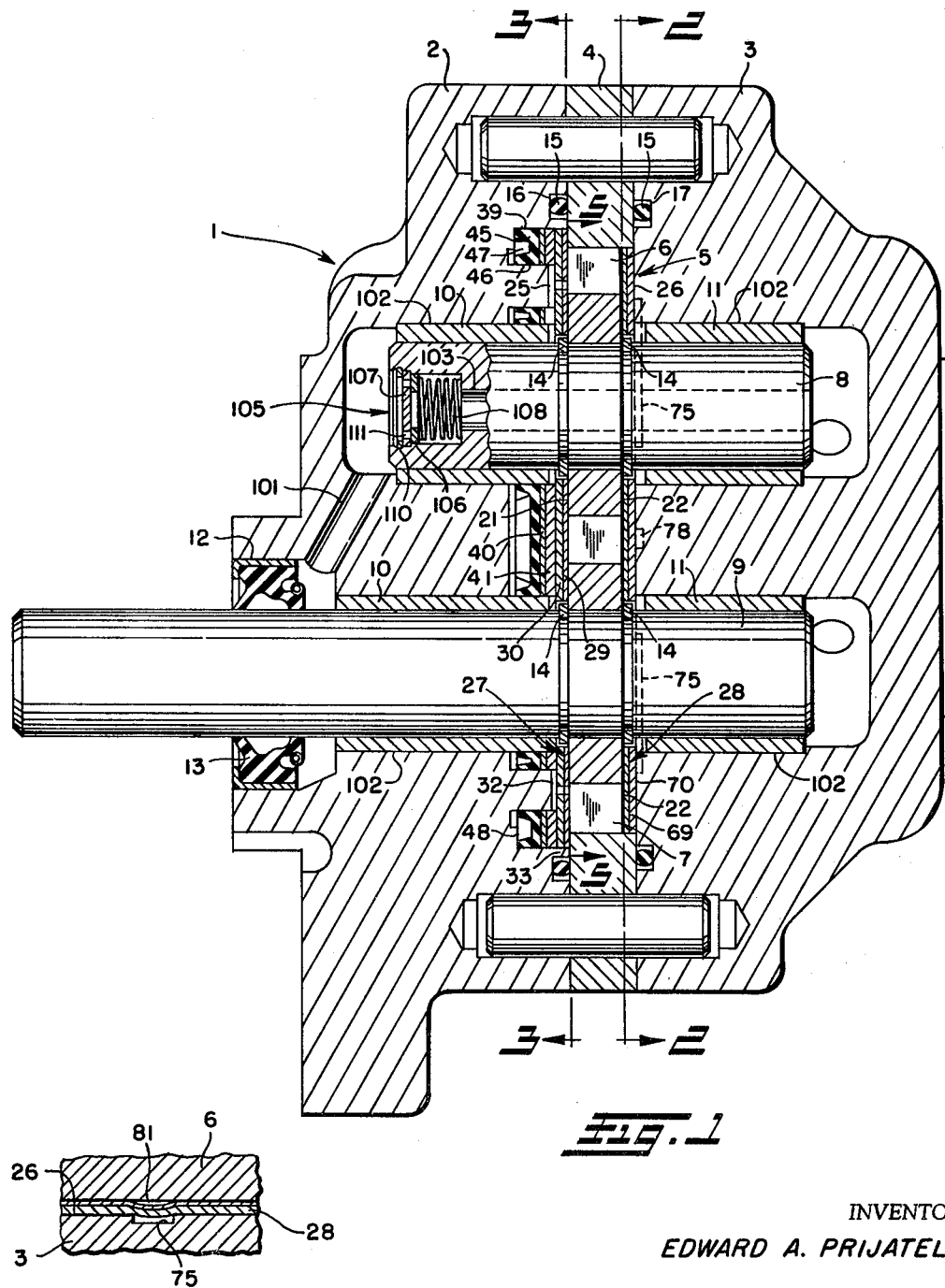
FIG. 1 is a longitudinal section through a preferred form of pump or motor in accordance with this invention.
FIG. 7 is a partial cross section along the lines 7—7 of FIG. 3 showing deflection of the thrust plate into the vent groove.

Referring now in detail to the drawings and first especially to FIG. 1, a pump or motor 1 is illustrated therein by way of example but is hereafter referred to as a pump, and generally comprises front and rear housing parts 2 and 3 with an intermediate housing part 4 interposed therebetween and suitably held together to provide an internal pump cavity 5 for receipt of a pair of pump impellers or gears 6 and 7.

The pump gears 6 and 7 are respectively supported by shafts 8 and 9 journalled in stationary sleeve bushings 10 and 11 in the front and rear housing parts 2 and 3. Snap rings 14 received in grooves in the shafts 8 and 9 adjacent opposite faces of the pump gears 6, 7 locate the pump gears on the shafts. One of the shafts 9 may extend outwardly through an opening 12 in the front housing part 2 for connection to a suitable prime mover, not shown, and a suitable rotary seal 13 may be disposed in the opening 12 around the shaft 9 to preclude leakage from the pump. Similarly, leakage between the mating faces of the front and rear housing parts 2, 3 and intermediate housing part 4 is precluded by the placement of O-ring seals 15 in grooves 16, 17 surrounding the pump cavity 5.

Figure 2:
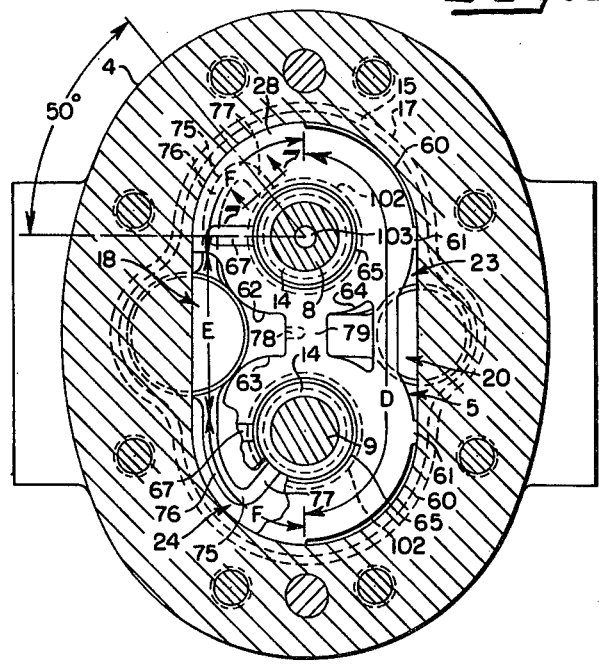
FIG. 2 is a transverse section on a reduced scale through the intermediate housing part of the pump of FIG. 1 with portions of the thrust plate broken away to show the configuration of the vent grooves in the wall of the back housing part engaged by the thrust plate, taken on the plane of the line 2—2.

Communicating with one side of the pump cavity 5 is an inlet 18 (see FIG. 2) from which the incoming fluid is conveyed in the gear tooth pockets in known manner for discharge under pressure from the outlet 20 at the opposite side of the pump cavity 5. As the pump pressure builds up, there is a tendency for the higher pressure fluid to leak past the side faces 21, 22 of the pump gears 6, 7 from the high pressure side 23 toward the low pressure side 24. To reduce substantially such fluid leakage and also eliminate wear of the inner walls 25 and 26 of the front and rear housing parts 2 and 3, removable plates 27 and 28 are provided between such housing parts and the adjacent gear faces. The plate 27 may be a wear plate of the type shown and described in the forementioned application Ser. No. 552,462, including an inner plate 29 of bronze or like metal and a steel backing 30 with suitably located bores 31 through the wear plate for passage of the gear shafts 8 and 9. As shown in FIG. 1 there is a slight clearance between the bores 31 and adjacent snap rings 14. The wear plate 27 is received in a similarly shaped recess 32 in the front housing part 2 which is slightly larger than the pump cavity 5 to provide a slight overlap between the wear plate and intermediate housing part 4. However, the recess 32 is radially inwardly spaced a slight distance from the adjacent groove 16 to provide a groove wall portion 33 for confining the O-ring 15.

Figure 5:
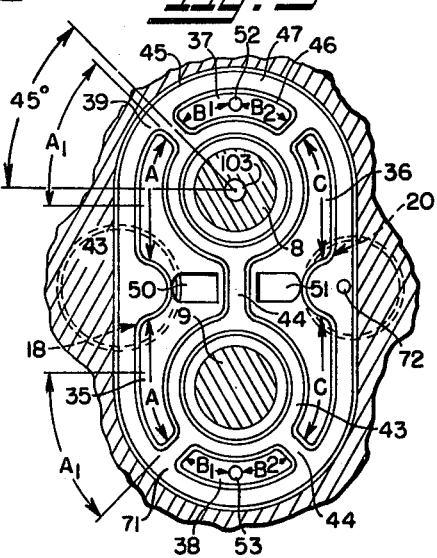
FIG. 5 is a fragmentary section on a reduced scale through the front housing part of FIG. 1 taken along the bottom of the groove and recess in which the seal and wear plate are respectively disposed to show the manner in which high pressure fluid is supplied to the intermediate compartments behind the wear plate, taken on the plane of the line 5—5.
Figure 3:
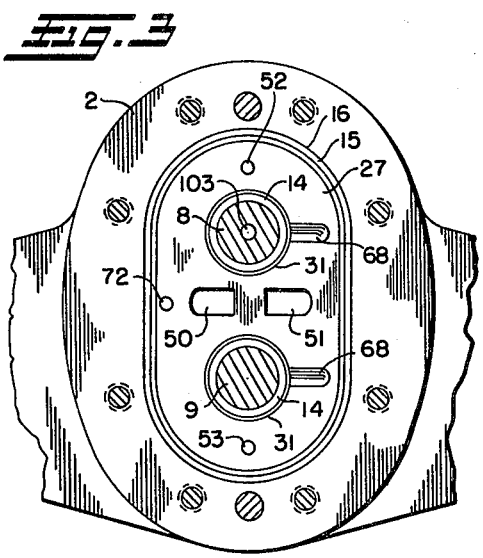
FIG. 3 is a transverse section on a still further reduced scale taken between the front and intermediate housing parts to illustrate the configuration of the wear plate as seen from the plane of the line 3—3, FIG. 1.
Figure 4:
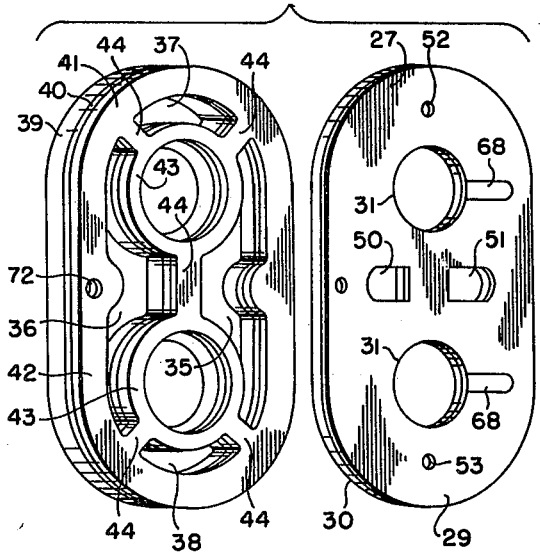
FIG. 4 is a perspective view on a reduced scale of the seal-gasket-heat shield of FIG. 1 with the wear plate shown in spaced relation therefrom.
Figure 6:
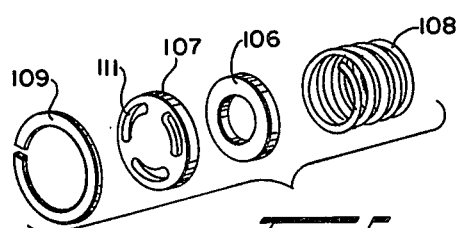
FIG. 6 is an enlarged exploded perspective view showing in disassembled form the various parts of the low pressure relief valve assembly for the pump of FIG. 1.

Also as in one form of the invention disclosed in the aforementioned application 552,462, the back face of the wear plate 27 is desirably divided into a pair of large pressure compartments 35, 36 opposite the low and high pressure sides 24 and 23 of the pump cavity 5 and a pair of smaller compartments 37, 38 intermediate the ends of the larger compartments by a racetrack type seal 39 with a gasket 40 and heat shield 41 interposed between the seal 39 and wear plate 27 (see especially FIGS. 4 and 5). Each of these parts, the seal 39, gasket 40 and heat shield 41, includes a circumferentially continuous outer margin 42 and a pair of inner continuous circular portions 43 connected together and to the outer margin 42 by fences 44 which define the boundaries of the several compartments 35–38.

Referring further to FIG. 1, the seal 39 has a V-section including a pair of lips 45 and 46 which define a channel 47 therebetween, and the bottom of the recess 32 has a groove 48 therein of a configuration like that of the seal 39, gasket 40, and heat shield 41 for receipt of these parts. The groove 48 is desirably stepped as shown whereby only the lip 45 along the outer periphery of the seal 39 contacts the bottom of the groove for a purpose to be subsequently explained. The heat shield 41 extends part way out of the recess 32 for maintaining the desired spacing for the compartments 35–38 between the bottom of the recess 32 and back face of the wear plate 27.

During assembly of the various pump elements, the lip 45 of the seal 39 in contact with the bottom of the groove 48 is squeezed somewhat due to pump tolerances thereby preloading the wear plate 27 against the intermediate housing part 4 but not against the pump gears 6, 7 since the pump gears are slightly narrower. The other lip 46, on the other hand, being out of contact with the groove bottom, is not squeezed and thus there is no preload on the pump gears, whereby a low breakaway torque for the gears is prevalent. Fluid communication is established between the respective compartments 35–38 and the pump cavity 5 by suitable openings 50, 51, 52, and 53 in the wear plate 27, whereby fluid pressure is supplied to the compartments which acts on the wear plate tending to urge the same toward the adjacent gear faces 21 in opposition to the fluid pressure within the pump cavity 5, urging the wear plate away from the gears, including the pressure of the fluid within the gear teeth pockets and the fluid film between the gear faces 21 and wear plate.

The magnitude of pressure within each of the compartments is determined by the magnitude of pressure in the pump cavity zone immediately opposite the various openings in the wear plate. Ordinarily, where the radial outer peripheries of the gear teeth have a close fit with the wall of the pump cavity as in the present case, the pressure in the gear tooth pockets as well as the fluid film pressure between the faces of the gear teeth and wear plate progressively increases from the lowest pressure zone at the pump inlet to the highest pressure zone at the pump outlet, in which event there usually is a balancing of the pressures on opposite sides of the wear plate only in the regions of the openings therein. In the remaining portions of the compartments there is an unbalance of pressure which is either higher or lower than the pressure in the pump cavity zone opposite such compartment portions depending on whether the compartment portions are on the high or low pressure side of the openings through the wear plate. For example, in that portion A of the compartment 35 extending from opening 50 to opposite ends of the compartment there would be a progressively increasing unbalance in the pressure tending to flex the plate 27 away from the gear faces in such A region; a progressively decreasing overbalance in the portions $B_1$ of the compartments 37, 38 from the low pressure end of the compartments to the openings 52, 53 tending to flex the plate 27 into sealing engagement with the gear faces; and a progressively increasing underbalance in the portions $B_2$ from the openings 52, 53 to the high pressure ends of the intermediate compartments tending to flex the plate 27 away from the gear faces; and a progressively increasing overbalance in the portions C of the compartment 36 from the opening 51 to opposite ends of the compartment tending to flex the plate 27 toward the gear faces. The net result would be a wear plate having large areas of the compartments 36, 37 and 38 pressed tightly against the gear faces to provide an effective seal and large areas of the compartments 35, 37, and 38 flexed out of engagement with the gear faces with consequent fluid leakage and non-uniform and excessive wear of the plate in the areas of high seal pressure. Such non-uniform loading and excessive wear of the wear plate 27 is substantially eliminated with the pump construction of this invention by providing a large zone of low fluid pressure in the pump cavity 5 opposite the compartment 35 and a high fluid pressure zone in the major portion of the pump cavity opposite the remaining compartments 36, 37 and 38.

In the aforementioned application Ser. No. 552,462, a large high pressure zone is created in the pump cavity by providing a radial relief in the pump cavity wall around a major portion of the pump gears to connect the gear tooth pockets in that region with the high pressure outlet, whereby the tooth pockets and fluid film between the adjacent gear teeth in that region will have the same high pressure as in the outlet. Alternatively, sickle grooves are provided in the inner wall of the housing contacted by the pump gear faces for connecting the gear tooth pockets with the high pressure outlet in a major portion of the pump cavity as before.

With the pump construction of the present invention, substantially the same high fluid pressure is established in a major portion D of the pump cavity 5 by providing a peripheral relief 60 on the high pressure side of the thrust plate 28 which is interposed between the gear faces 22 and adjacent housing wall 25. As clearly shown in FIG. 2, the relief 60 may be substantially continuous from approximately the middle of the intermediate compartments 37, 38 except for a pair of radial projections 61 which accurately locate and support the thrust plate 28 within the pump cavity 5. Accordingly, the need for relieving the pump cavity wall is completely eliminated, as is the need for sickle grooves in the inner wall of the rear housing 3.

The plate 28 may also be provided with a relieved portion 62 on the low pressure side 18 for creating a large zone E of uniform low pressure opposite the compartment 35 but of less extent. The relieved portion 62 has an enlarged medial section 63 which cooperates with an aperture 64 in the thrust plate 28 adjacent the high pressure side to prevent fluid from being trapped between the gear teeth as they come together. Bores 65 in the thrust plate 28 receive the gear shafts 8, 9 therethrough, there being a slight clearance between the bores 65 and adjacent snap rings 14, and pockets 67 may be provided in the inner face of the thrust plate for lubricating the gear faces during operation, similar to the lube pockets 68 in the inner face of the wear plate 27. Moreover, the thrust plate 28 may be a laminate similar to the wear plate 27 consisting of an inner layer 69 of bronze or like metal for engagement with the gear faces 22 and a steel backing 70.

With the thrust plate 28 properly positioned in the pump cavity 5 between the gear faces 22 and inner wall 26 of the rear housing part 3 as shown, the high pressure admitted to the compartment 36 through the opening 50 in the wear plate 27 is the same as the pressure in the pump cavity 5 opposite such compartment whereby the wear plate 27 is balanced in that region. The pressure acting on opposite sides of the wear plate 27 in the region of the compartment 35 which overlies the low pressure zone E is also balanced due to the same low pressure being admitted to the compartment 35 through the opening 51 in the wear plate. Beyond the low pressure zone E up to the high pressure zone D there is a zone F where the pressure in the gear tooth pockets as well as the fluid film pressure between the adjacent gear teeth and the wear plate progressively increases whereby there is an underbalance of pressure in that portion $A_1$ of the compartment 35 overlying the zone F tending to flex the plate 27 away from the gear faces.

In the intermediate compartments 37, 38, the same high pressure as at the outlet 20 is supplied thereto through the openings 52, 53 therein because of the peripheral relief 60 on the thrust plate 28 which extends the high pressure zone D to the approximate centers of the intermediate compartments, whereby the portions $B_2$ of the intermediate compartments 37, 38 opposite the high pressure zone D is balanced. However, the compartments 36, 37, and 38 are slightly larger in area than the major pump cavity area D so as to overlap a relatively small portion of the cavity area F that it is subjected to intermediate pressure whereby the wear plate 27 will be overbalanced tending to flex the same into sealing engagement with the gear faces only along a relatively small area at such intermediate pressure zone. Thus, the pressure in the portions $B_1$ of the compartments 37, 38 which overlie the intermediate pressure zone F provides a differential or overbalanced pressure in those portions tending to press the wear plate 27 against the gear teeth side faces to provide an effective seal.

It can now be seen that a substantial portion of the area of the wear plate is either fluid pressure balanced or slightly overbalanced in a direction tending to unseat the wear plate from the gear teeth faces with only a small area of the wear plate subject to a differential pressure acting to press the plate into sealing contact with the gear faces, whereby the friction and wear between the wear plate and gear faces is minimized. High pressure is also admitted to the channel 47 of the seal 39 through aligned apertures 72 in the seal, gasket 40, heat shield 41, and wear plate 29 communicating with the high pressure zone D in the pump cavity 5 for maintaining the seal, gasket and heat shield in fluid-tight engagement with the wear plate 27 to preclude leakage of fluid between compartments and further assist in maintaining the wear plate in sealing engagement with the gear faces.

Although there are no fluid compartments as such behind the thrust plate 28, nevertheless there is a tendency for a thin film of high fluid pressure to seep behind the thrust plate which is balanced on the high pressure side of the pump but not on the low pressure side. If not relieved on the low pressure side, this high fluid pressure may press the low pressure side of the thrust plate too tightly against the faces of the gears and cause uneven wear of the thrust plate with consequent serious damage. To alleviate this overbalance of pressure on the low pressure side, vent grooves 75 are provided in the inner wall 26 of the rear housing part 3. As apparent from FIG. 2, these vent grooves 75 include circumferentially extending portions 76 in communication with the inlet 18 and radial portions 77 extending across the face of the thrust plate 28. Such vent grooves 75 prevent high pressure fluid from acting on the back side of the thrust plate 28 in the region of the vent grooves, whereby there is a slight overbalance of pressure in the pump cavity 5 urging the thrust plate 28 into sealing contact with the rear housing part 3. A smaller groove 78 may be provided in the inner wall of the rear housing part 3 behind the central portion 79 of the thrust plate 28 to vent that region to the low pressure side 18.

Vent groove radial portions 77 are angularly spaced about 50° from the horizontal so as to overlap high pressure compartments 37, 38, which extend to within 45° of the horizontal. This overlap assures an overbalance of fluid pressure on the wear plate for transmission to the thrust plate to maintain the latter against rear housing part 3. On the other hand, vent groove portions 77 are angularly spaced from reliefs 60 a sufficient distance to preclude significant leakage between the thrust plate and rear housing 3 from the high pressure zone defined by relief 60 to the vent grooves 75.

Thrust plate 28 is somewhat flexible so that during operation it will deflect into vent grooves 75 to form slight clearances 81 between the thrust plate and the adjacent gear face, as shown in an exaggerated manner in FIG. 7. These clearances 81 permit a thin film of oil to form between the gear face and thrust plate for lubrication purposes. Vent groove radial portions 77 extend inwardly to intersect shaft bores 102 and thus traverse the thrust plates in the region opposite the hub portions of the gears. The thrust plates deflect into the vent groove portions 77 in this region in the manner aforesaid to provide lubrication in addition to that provided by grooves 67, in the critical region between the gear hubs and the thrust plates.

The pressure loading on the wear plate 27 as previously described urges the pump gears 6, 7 axially toward the thrust plate 28, thereby to establish sealing contact between the pump gear faces 21, 22 and adjacent wear plate and thrust plate surfaces.

Fluid pressure which leaks along the gear shaft 9 into the opening 12 for the rotary seal 13 is vented to the inlet 18 through a passage 101 interconnecting the shaft receiving bores 102 in the front housing part 2 and a longitudinal bore 103 in the gear shaft 8. It is desirable to maintain a low pressure in the order of 5 p.s.i. against the shaft seal 13 to preclude air and foreign matter from being drawn into the interior of the pump should the inlet pressure be less than atmospheric, and for that purpose there is provided a low pressure relief valve assembly 105 in the bore 103. As can be seen in FIGS. 1 and 5, the low pressure relief valve assembly 105 desirably comprises a ring-shaped valve member 106 which is urged into seating engagement with a disc-shaped seat member 107 by a spring 108. A snap ring 109 may be used to retain the seat member 107 against a shoulder 110 in the shaft bore 103. The seat member 107 has arcuate slots 111 therein which are covered by the valve member 106 when seated but permit the passage of fluid when the valve member is moved away from the seat member by fluid pressure exceeding approximately 5 p.s.i. Both the valve member 106 and seal member 107 may be inexpensively formed from a low cost, light weight material such as linen phenolic, and because the relief valve assembly 105 is located on center with respect to the axis of the shaft 8, the centrifugal force acting on the relief valve assembly tending to shift or unseat the valve member 106 during rotation of the pump gears is substantially eliminated.

Other modes of applying the principles of the invention may be employed, change being made as regards the details described, provided the features stated in any of the following claims or the equivalent of such be employed.

I, therefore, particularly point out and distinctly claim as my invention:

1. In a gear-type rotary pump having a cavity including inlet and outlet ports and corresponding low and high pressure zones, intermeshing gears rotatable in said cavity to generate pressure in the fluid conveyed by said gears from said inlet port to said outlet port, and a relatively thin flexible thrust plate interposed between and in direct contact with one of the faces of said gears and the adjacent wall of said cavity; wherein the improvement comprises a vent groove in said adjacent wall of said cavity behind said thrust plate, said vent groove being in communication with said inlet port and extending circumferentially in the direction of said outlet port to preclude a buildup of high fluid pressure behind said thrust plate in the region of said vent groove tending to force said thrust plate against said gear faces.

2. The pump of claim 1 wherein the end portion of said vent groove remote from said inlet port extends in a radial direction across the back of said thrust plate to vent the entire back of said thrust plate from said radial end portion to said inlet port.

3. The pump of claim 1 further comprising means for extending the low pressure zone of said cavity adjacent said inlet port over a larger portion of said pump cavity, said vent groove extending beyond said extended low pressure zone whereby there is an overbalance of pressure in said cavity urging said thrust plate into sealing contact with said adjacent wall of said cavity.

4. The pump of claim 3 further comprising means for extending the high pressure zone of said outlet port over a substantial portion of said pump cavity, means to substantially pressure balance said thrust plate on opposite sides in said high pressure zone, and means providing an intermediate pressure zone in said cavity between said low and high pressure zones circumferentially beyond said vent groove, whereby said thrust plate is overbalanced in said intermediate pressure zone tending to urge said thrust plate into sealing engagement with said adjacent wall of said cavity.

5. The pump of claim 3 wherein said means for extending the low pressure zone of said cavity comprises a relieved portion on the outer periphery of said thrust plate extending from said inlet port peripherally toward said outlet port.

6. The pump of claim 4 wherein said means for extending the high pressure zone of said cavity comprises a relieved portion on the outer periphery of said thrust plate extending from said outlet port toward said inlet port.

7. The pump of claim 6 further comprising radial projections on said thrust plate which interrupt said relieved portion for accurately locating and supporting said thrust plate in said cavity.

8. The pump of claim 1 wherein said gears are supported by shafts journalled in the housing of said pump, one of said shafts extending outwardly through an opening in said housing for connection to a prime mover, a rotary seal disposed in said opening to preclude leakage from said pump, passage means in said pump for venting said rotary seal to said inlet port, and check valve means in said passage means for maintaining sufficient internal pressure against said rotary seal to preclude air and foreign matter from being drawn into said pump when the inlet pressure is below atmospheric, said check valve means comprising a disc-shaped valve seat fixed in said passage means, a ring-shaped valve member movable into and out of engagement with said valve seat, said valve seat having arcuate slots therein covered by said valve member when seated, and spring means for yieldably maintaining said valve member in engagement with said valve seat in opposition to the fluid pressure acting on said rotary seal.

9. A rotary pump comprising a housing having a pump cavity, intermeshing gears rotatable in said cavity to provide adjacent intermediate and high fluid pressure zones in said cavity, a relatively thin flexible wear plate in said housing having a front face contacting one of the faces of said gears, a relatively thin flexible thrust plate in said housing having a front face contacting the other faces of the gears, a first relieved portion on the outer periphery of said thrust plate extending said high pressure zone over a major portion of said cavity, first compartment means on the rear face of said wear plate opposite said high pressure zone and at least a portion of said intermediate pressure zone, and means communicating said first compartment means with said high pressure zone whereby the portion of said first compartment means opposite said high pressure zone is fluid pressure balanced and the portion of said first compartment means opposite said intermediate pressure zone is overbalanced tending to flex said wear plate into sealing engagement with said gear faces.

10. The pump of claim 9 wherein said first compartment means comprises a plurality of separate compartments, and apartures are provided in said wear plate communicating said separate compartments with said high pressure zone.

11. The pump of claim 9 further comprising a low fluid pressure zone in said cavity, and a second relieved portion on the outer periphery of said thrust plate extending said low pressure zone leaving a relatively small intermediate pressure zone between said low and high pressure zones, a second compartment means on the rear face of said wear plate opposite said low pressure zone, and means communicating said second compartment means with said low pressure zone whereby the portion of said second compartment means opposite said low pressure zone is substantially fluid pressure balanced.

12. The pump of claim 11 wherein a portion of said second compartment means is opposite a portion of said intermediate pressure zone, whereby that portion of said second compartment means opposite a portion of said intermediate pressure zone is underbalanced tending to flex said wear plate out of sealing engagement with said gear faces.

13. The pump of claim 11 further comprising a vent groove in the wall of said housing behind said thrust plate, said vent groove being in communication with said low pressure zone and extending substantially the full length thereof to preclude a buildup of pressure behind said thrust plate in the region of said vent groove greater than the pressure in said low pressure zone.

14. The pump of claim 13 wherein said vent groove extends opposite a portion of said intermediate pressure zone, whereby the portion of said thrust plate whereat said vent groove is opposite said intermediate pressure zone is underbalanced tending to urge said thrust plate out of sealing engagement with the adjacent gear faces thereat, and the portion of said thrust plate whereat said intermediate pressure zone is beyond said vent groove is overbalanced tending to urge said thrust plate into sealing engagement with the adjacent gear faces threat.

15. The pump of claim 11 wherein said gears are supported by shafts journalled in the housing of said pump, one of said shafts extending outwardly through an opening in said housing for connection to a prime mover, and there is a rotary seal disposed in said opening to preclude leakage from said pump, passage means in said pump for venting said rotary seal to said low pressure zone, and check valve means in said passage means for maintaining sufficient internal pressure against said rotary seal to preclude air and foreign matter from being drawn into said pump when the pressure in said low pressure zone is below atmospheric, said check valve means comprising a disc-shaped valve seat fixed in said passage means, a ring-shaped valve member movable into and out of engagement with said valve seat, said valve seat having arcuate slots therein covered by said valve member when seated, and spring means for yieldably maintaining said valve member in engagement with said valve seat in opposition to the fluid pressure acting on said rotary seal.

16. A rotary pump having a housing containing a pump cavity including inlet and outlet ports, intermeshing gears rotatable in said cavity to generate pressure in the fluid conveyed by the gears from said inlet port to said outlet port, said gears being supported by shafts journalled in said housing, one of said shafts extending outwardly through an opening in said housing for connection to a prime mover, a rotary seal disposed in said opening to preclude leakage from said pump, and passage means in said pump for venting said rotary seal to said inlet port; wherein the improvement comprises check valve means in said passage means for maintaining sufficient internal pressure against said rotary seal to preclude air and foreign matter from being drawn into said pump when the inlet pressure is below atmospheric, said check valve means comprising a disc-shaped valve seat fixed in said passage means, a ring-shaped valve member movable into and out of engagement with said valve seat, said valve seat having arcuate slots therein covered by said valve member when seated, and spring means for yieldably maintaining said valve member in engagement with said valve seat in opposition to the fluid pressure acting on said rotary seal.

17. The pump of claim 16 wherein said passage means includes a first passage interconnecting the shaft receiving bores in said housing, and a longitudinal bore in the other gear shaft, said check valve means being disposed in said longitudinal bore.

18. A check valve assembly comprising a body member having a passage therein, a disc-shaped valve seat fixed in said passage, a ring-shaped valve member movable into and out of engagement with said valve seat, said valve seat having arcuate slots therein covered by said valve member when seated, and spring means for yieldably maintaining said valve member in engagement with said valve seat.

19. In a pump having a cavity connected to inlet and outlet ports, intermeshing gears rotatable in the cavity to generate pressure in the fluid conveyed by the gears from the inlet port to the outlet port, a thrust plate between one side of the gears and the adjacent wall of the cavity, and in which the fluid pressure in the cavity region toward the outlet port is higher than in the region toward the inlet port; the improvement comprising a vent groove in said adjacent wall opposite said lower pressure region, said vent groove being spanned by said thrust plate, and said plate being flexible so as to be deflected into said vent groove by fluid pressure in said cavity to form a slight clearance between the thrust plate and the adjacent gear side face to serve as a lubrication groove.

20. The pump of claim 19 in which said vent groove includes a portion extending opposite an end face of a hub on one of said gears, and said thrust plate is deflectable by said cavity fluid pressure into said vent groove portion.

References Cited

UNITED STATES PATENTS

| | | | |
|---|---|---|---|
| 2,728,301 | 12/1955 | Lindberg | 103—126 |
| 2,758,548 | 8/1956 | Rockwell | 103—126 |
| 2,787,224 | 4/1957 | Udale | 103—126 |
| 2,870,720 | 1/1959 | Lorenz | 103—126 |
| 2,980,028 | 4/1961 | Edwards et al. | 103—126 |
| 3,171,359 | 3/1965 | Spencer et al. | 103—126 |
| 3,263,620 | 8/1966 | Schofield | 103—126 |
| 3,416,459 | 12/1968 | Reimer | 103—126 |

WILLIAM L. FREEH, Primary Examiner

WILBUR J. GOODLIN, Assistant Examiner

U.S. Cl. X.R.

103—216